PENNIE'S PATENTED
Improved
NOV 26 1867
71530
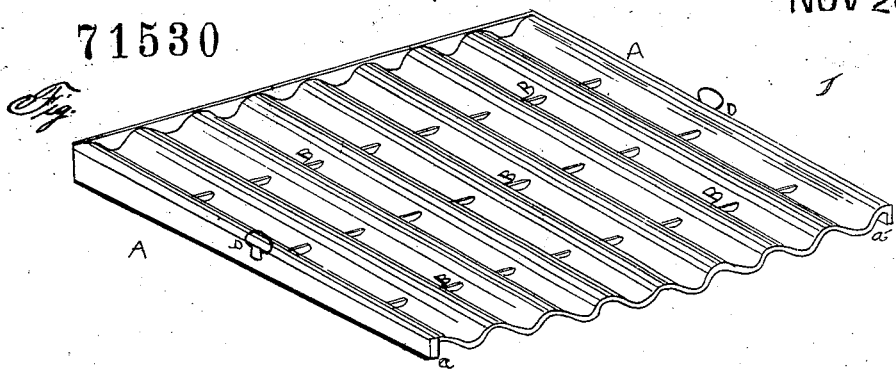
ICE-RACK.
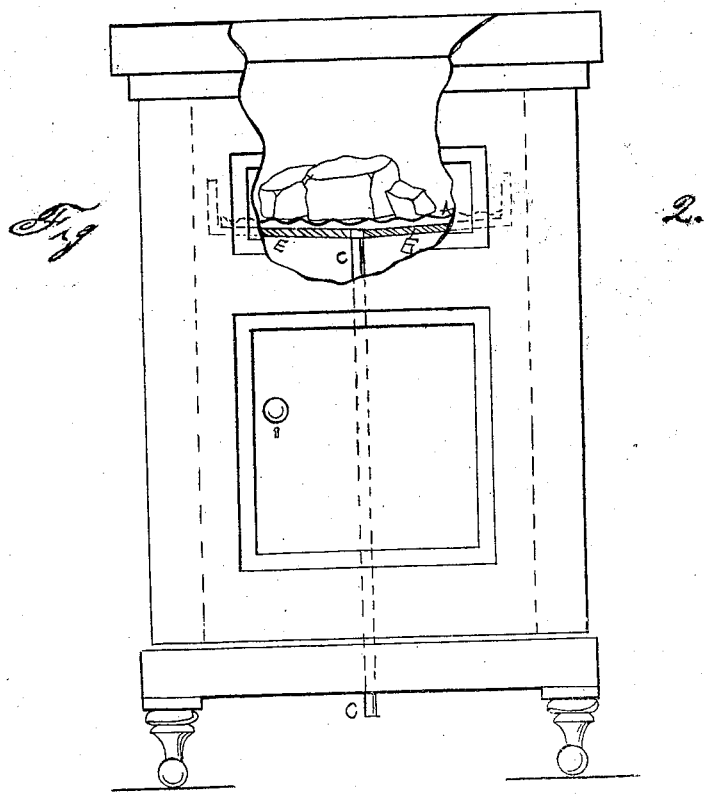
Henry Pennie
Witnesses:
N. B. Brown
Earl H. Smith

United States Patent Office.

HENRY PENNIE, OF NEW YORK, N. Y.

Letters Patent No. 71,530, dated November 26, 1867.

---

IMPROVED ICE-RACK FOR REFRIGERATORS.

---

The Schedule referred to in these Letters Patent and making part of the same.

---

TO ALL WHOM IT MAY CONCERN:

Be it known that I, HENRY PENNIE, of the State, city, and county of New York, have invented an Improved Portable or Removable Metallic Ice-Rack; and I do hereby declare that the following is a full, clear, and exact description thereof, reference being had to the accompanying drawings, which form part of this specification.

In refrigerators, the ice for cooling the contents is placed in a receptacle called a "trough," wherein it is customary to break the ice, as it is required for use elsewhere. Such trough is variously made of slate, glass, wood covered with zinc, &c., and the bottom thereof is liable to be perforated, if zinc, and fractured, if of glass or slate, by the ice-pick, hatchet, or other sharp and pointed instruments used for breaking the ice. Said trough also receives the sediment and all foreign matter found combined with the ice.

The object of my invention is to provide, in a single article, a capacity for completely protecting the bottom of the ice-trough against all liability of injury from the ice-pick, as aforesaid, and also furnish facilities, not hitherto afforded in refrigerators, for collecting and removing all foreign matter deposited from the ice, thereby promoting cleanliness; this invention being designed more particularly as an article for application to refrigerators already in use, whether in part of glass, slate, or wood.

To enable others skilled in the art to make and use my invention, I will proceed to describe the same. In the annexed drawing—

Figure 1 shows the article in perspective, and

Figure 2 illustrates its application to a refrigerator.

A is the ice-rack; it is corrugated in form, in order to present as little surface as possible to the ice, to support the same above the water formed by its melting, and to provide for carrying off the water. The corrugations present ridges for the support of the ice, while the depressions serve as gutters to collect the water and sediment from the ice. If, however, such refuse is allowed to flow off the surface into the bottom of the "trough," it becomes inconvenient of removal, and is liable to choke up the leader C, which conducts the waste water from the trough E. To prevent the refuse from leaving the surface of the rack, small cleats B are provided, crossing the bottoms of the gutters; these arrest all sediment and foreign matter, causing the same to be retained, while the water is allowed to flow off freely. A rim, $a'$, is formed around the edge, to impart stiffness. Handles D are fixed to each side, by which the rack may be lifted out, when required to be cleansed.

This article is now being applied to refrigerators, and is found to answer well in practice, fulfilling all the offices for which it is intended with great success.

I do not claim a cast-iron ice-rack.

Having thus described my invention, what I claim as new, and desire to secure by Letters Patent, is—

The use of the cross-cleats B, for the purpose specified, in a corrugated metallic ice-rack, substantially as described.

HENRY PENNIE.

Witnesses:
   N. B. BROWN,
   EARLE H. SMITH.